(12) United States Patent
Umeda

(10) Patent No.: US 7,266,730 B2
(45) Date of Patent: Sep. 4, 2007

(54) INFORMATION SYSTEM

(75) Inventor: Takashi Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 678 days.

(21) Appl. No.: 10/830,025

(22) Filed: Apr. 23, 2004

(65) Prior Publication Data

US 2005/0154940 A1 Jul. 14, 2005

(30) Foreign Application Priority Data

Dec. 1, 2003 (JP) .............................. 2003-401918

(51) Int. Cl.
*G06G 11/00* (2006.01)
(52) U.S. Cl. .......................................... 714/41; 703/23
(58) Field of Classification Search .................. 714/25, 714/35, 41, 27, 39; 703/23, 24, 25, 26
See application file for complete search history.

(56) References Cited

U.S. PATENT DOCUMENTS

| | | | | |
|---|---|---|---|---|
| 6,123,735 A | * | 9/2000 | Raghavan et al. | ............. 703/21 |
| 6,484,276 B1 | * | 11/2002 | Singh et al. | ................... 714/41 |
| 6,976,189 B1 | * | 12/2005 | Schoenthal et al. | ........... 714/41 |
| 7,020,803 B2 | * | 3/2006 | Wolin et al. | ................... 714/41 |
| 7,137,035 B2 | * | 11/2006 | Sato et al. | ..................... 714/25 |
| 7,159,142 B2 | * | 1/2007 | Yamaguchi et al. | .......... 714/28 |
| 7,177,986 B2 | * | 2/2007 | Rowlands et al. | .......... 711/144 |
| 2004/0153774 A1 | * | 8/2004 | Gavish et al. | ................. 714/25 |
| 2004/0153790 A1 | * | 8/2004 | Swoboda et al. | ............. 714/25 |

FOREIGN PATENT DOCUMENTS

| | | |
|---|---|---|
| JP | 8-227313 | 9/1996 |
| JP | 2000-252987 | 9/2000 |

* cited by examiner

*Primary Examiner*—Robert W. Beausoliel
*Assistant Examiner*—Amine Riad
(74) *Attorney, Agent, or Firm*—Staas & Halsey LLP

(57) ABSTRACT

An information system is provided including a server, a data storage device and a connection device; and is characterized in that the connection device includes a memory unit for storing a test list in which are associated information identifying the data storage device to be tested and setting information relating to tests; and a test unit which upon input of the input/output request, references the test list and judges whether the destination of the input/output request is the data storage device to be tested, and if the destination of the input/output request is the storage device to be tested, outputs the input/output request to the transmission/reception unit after a prescribed length of time.

11 Claims, 12 Drawing Sheets

FIG. 6

| TYPE | DEVICE NAME | DISTRIBUTION METHOD | PARAMETER 1 | PARAMETER 2 |
|---|---|---|---|---|
| I | DEV1 | NORMAL DISTRIBUTION | $\mu$ | $\sigma$ |
| I | DEV2 | POISSON DISTRIBUTION | $\lambda$ | |
| I | ... | ... | ... | ... |

FIG. 9

| TYPE | DEVICE NAME | ACCESS TYPE | DATA SIZE | IO RATE | IO ISSUES FREQUENCY |
|---|---|---|---|---|---|
| II | DEV1 | RANDAM | 4 (KB) | 1 | 200 (IO/SEC) |
| II | DEV2 | SEQUENTIAL | 4 (KB) | 0.5 | 200 (IO/SEC) |
| II | ... | ... | ... | ... | ... |

FIG. 11

| TYPE | DEVICE NAME | IO TYPE | ERROR OCCURRENCE PROBABILITY | ERROR TYPE | THE NUMBER OF RECEIVED IO | THE NUMBER OF ERROR RESPONSE |
|---|---|---|---|---|---|---|
| III | DEV1 | READ | 0.6 | MSG-A | 0 | 0 |
| III | DEV1 | WRITE | 0.5 | MSG-B | 0 | 0 |
| III | DEV2 | READ | 0.2 | MSG-C | 0 | 0 |
| III | ... | ... | ... | ... | ... | ... |

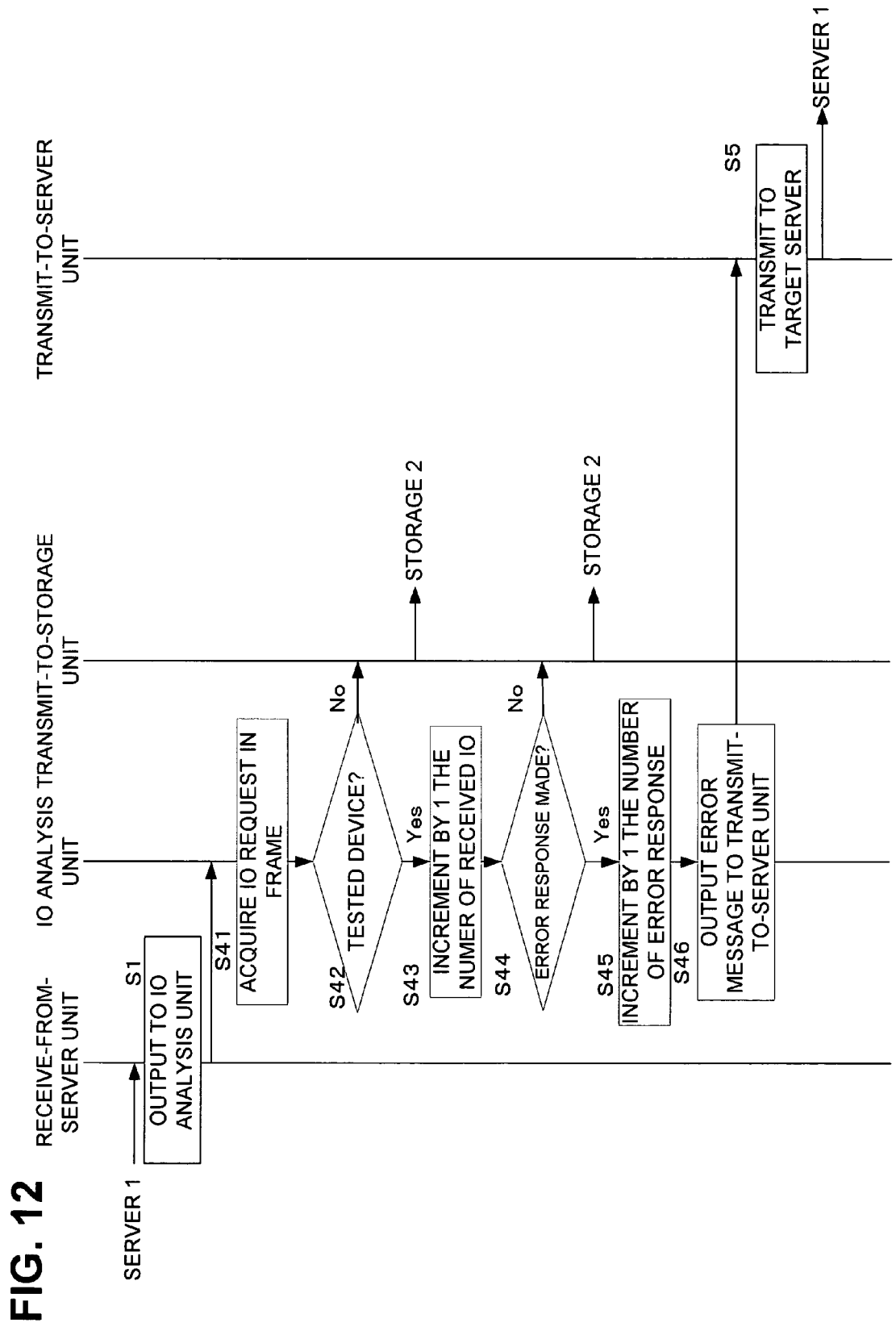

INFORMATION SYSTEM

BACKGROUND OF THE INVENTION

1. Field of the Invention

This invention relates to a testing method in an information system having storage (data storage devices) shared by a plurality of servers, in which loads and errors are generated in the storage to conduct tests, and also relates to an information system performing such tests.

2. Description of the Related Art

In recent years, there have been an increasing number of examples of information systems constructed from a plurality of servers and a plurality of storage products, with the object of streamlining operations or providing services to customers. Examples include business systems which perform sales processing, order processing and financial processing, and service delivery systems which deliver web contents. In such information systems, various tests are often performed, including performance tests to accumulate information relating to performance of the information system and operation tests to verify the operation of the information system, in order to judge whether the system meets the requirements demanded of the user introducing the information system.

In such tests, often errors or loads are caused in storages. For example, as performance tests, usage rate, response time or other parameters of resources, such as the CPU or memory in servers or the disks in the storages may be measured when loads are generated in the storages, and as operation tests, errors may be caused in storage devices to verify whether processing can be continued by the information system using only storage devices in which errors have not occurred (which are normal).

In the past, mechanisms to generate storage loads and errors have been incorporated into either servers or storages. For example, when the generation mechanism is realized in a computer program, the program must be installed in the server; the program will differ for each server OS (operating system), vendor of the storage equipment, and host bus adapter (equipment on the server side functioning as an interface with the storage equipment) used.

When the above generation mechanism is realized in hardware, when for example the generation mechanism is incorporated into a host bus adapter (HBA), either the firmware of the HBA must be rewritten, or an HBA with firmware functioning as the generation mechanism must be newly installed. When incorporating the above generation mechanism in storage, either the firmware of the controller which controls storage must be rewritten, or the controller must be replaced with a controller equipped with firmware to function as a generation mechanism. As conventional technology, a method has been disclosed to generate pseudo-traffic in order to evaluate network performance using dummy loads (see for example Japanese Patent Laid-open No. 2000-252987).

However, because in conventional testing methods the mechanism to generate loads and errors is incorporated in servers or storages, there are the following problems. First, when the mechanism to generate loads or errors is realized in a program, processing of the program consumes the server CPU, memory and other resources for original processing to attain the original objectives for which the information system was introduced (for example, if a business system, execution of business applications; of a service delivery system to deliver web content, then web server applications). So they are in race contention and a different situation is simulated from a situation in which loads and errors generate when the above original processing is actually performed.

Secondly, when the above generation mechanism is realized in a program, a variety of different programs must be prepared according to differences in OSes, different storage equipment vendors, differences in HBAs used, and similar, so that considerable labor and time are required to install the programs on individual servers and to make program settings after installation. Third, when the above generation mechanism is realized in hardware, considerable time and labor are again required for installation of the hardware and to make settings after the installation.

SUMMARY OF THE INVENTION

Thus an object of the invention is to provide a testing method enabling simulation of situations in which loads and errors occur, without contention with business applications or similar for the use of server resources. Another object of the invention is to provide a testing method which reduces the labor and time required for preparations prior to testing compared with the prior art. And still another object of the invention is to provide an information system to which the above-described testing method is applied.

The above objects are attained by providing an information system containing a server, a data storage device which is accessed by issuing input/output requests in order to write information or to read the above written information, and a connection device connected to the above server and the above data storage device, including a transmission/reception unit for mediation of information exchanged between the above server and the above data storage device, which transfers the above input/output requests transmitted from the above server to the above data storage device and transfers information returned by the above data storage device in response to an input/output request to the above server; the information system is characterized in that the above connection device further includes a memory unit which stores in advance in the above storage device a test list associating information identifying the above data storage device to be tested and setting information related to testing and a testing unit which is connected to the above transmission/reception unit and to the above memory unit, and which, when the above input/output request received by the above transmission/reception unit is input, references the above test list and decides whether the destination of the input/output request is the above data storage device to be tested, and when the destination of the input/output request is the storage device to be tested, after a prescribed time elapses outputs the input/output request to the above transmission/reception unit.

Also, the above objects are attained by providing an information system containing a server, a data storage device which is accessed by issuing input/output requests in order to write information or to read the above written information, and a connection device connected to the above server and the above data storage device, including a transmission/reception unit for mediation of information exchanged between the above server and the above data storage device, and which transfers the above input/output requests transmitted from the above server to the above data storage device and transfers information returned by the above data storage device in response to an input/output request to the above server; the information system is characterized in that the above connection device further includes a memory unit which stores in advance in the above storage device a test list associating information identifying the above data storage device to be tested and setting information related to testing and a testing unit which is connected to the above transmission/reception unit and to the above memory unit, and which, when the above input/output request received by the above transmission/reception unit is input, references the above test list and decides whether the destination of the input/output request is the above data storage device to be tested, and when the destination of the input/output request is the above storage device to be tested, generates an error message at a prescribed rate and outputs the error messages to the above transmission/reception unit; and the above transmission/reception unit, upon input of the above error message from the above testing unit, sends the error message to the above server which had issued the above input/output request.

Also, the above objects are attained by providing an information system containing a server, a data storage device which is accessed by issuing input/output requests in order to write information or to read the above written information, and a connection device connected to the above server and the above data storage device, including a transmission/reception unit to which the above server and the above data storage device for mediation of information exchanged between the above server and the above data storage device, and which transfers the above input/output requests transmitted from the above server to the above data storage device and transfers information returned by the above data storage device in response to an input/output request to the above server; the information system is characterized in that the above connection device further includes an input/output generation unit, connected to the above transmission/reception unit, which takes request source to be the above connection device, which generates the above input/output request taking the destination to be the above data storage device, and which outputs the above generated input/output request to the above transmission/reception unit; and, the above transmission/reception unit, upon receiving information from the above data storage device in response to the above input/output request generated by the above testing unit, discards the information.

Also, the above objects are attained by providing an testing method which generates loads for a data storage device in an information system containing a server, a data storage device which is accessed by issuing input/output requests in order to write information or to read the above written information, and a connection device connected to the above server and the above data storage device, including a transmission/reception unit for mediation of information exchanged between the above server and the above data storage device, and which transfers the above input/output requests transmitted from the above server to the above data storage device and transfers information returned by the above data storage device in response to an input/output request to the above server; characterized in that the above connection device receives the above input/output request issued by the above server to the above data storage device, decides whether the destination of the input/output request is the above data storage device which is the subject of testing, and when the destination of the input/output request is the subject of testing, after holding the input/output request for a prescribed time, transmits the request to the above data storage device at the above destination, to generate a pseudo-load on the above data storage device.

By means of this invention, various tests, including performance tests and operation tests, can be executed without the need to incorporate a mechanism to generate errors or loads in the server or storage, and without contention with a business application or similar executed by the server. Further, connection devices used in a testing method of this invention, and incorporated into the above generation mechanism, may be fewer in number than the number of servers or storage devices, and moreover the above connection devices can be introduced with no consideration paid to differences in OSes, storage device vendors, or the HBAs used, so that the labor and time required for preparations prior to testing can be reduced compared with the prior art.

BRIEF DESCRIPTION OF THE DRAWINGS

FIG. 6 is an example of the data configuration of a test list when executing a first test;

FIG. 9 is an example of the data configuration of a test list when a second test is executed;

FIG. 11 is an example of the data configuration of a test list when a third test is executed; and, FIG. 12 is a flowchart explaining processing performed by a functional unit relating to a third test during a test execution period.

DESCRIPTION OF THE PREFERRED EMBODIMENTS

Below, aspects of this invention are explained using the drawings. However, the technical scope of this invention is not limited to these aspects, but extends to the inventions described in the scope of claims and inventions equivalent thereto.

Figure 1:
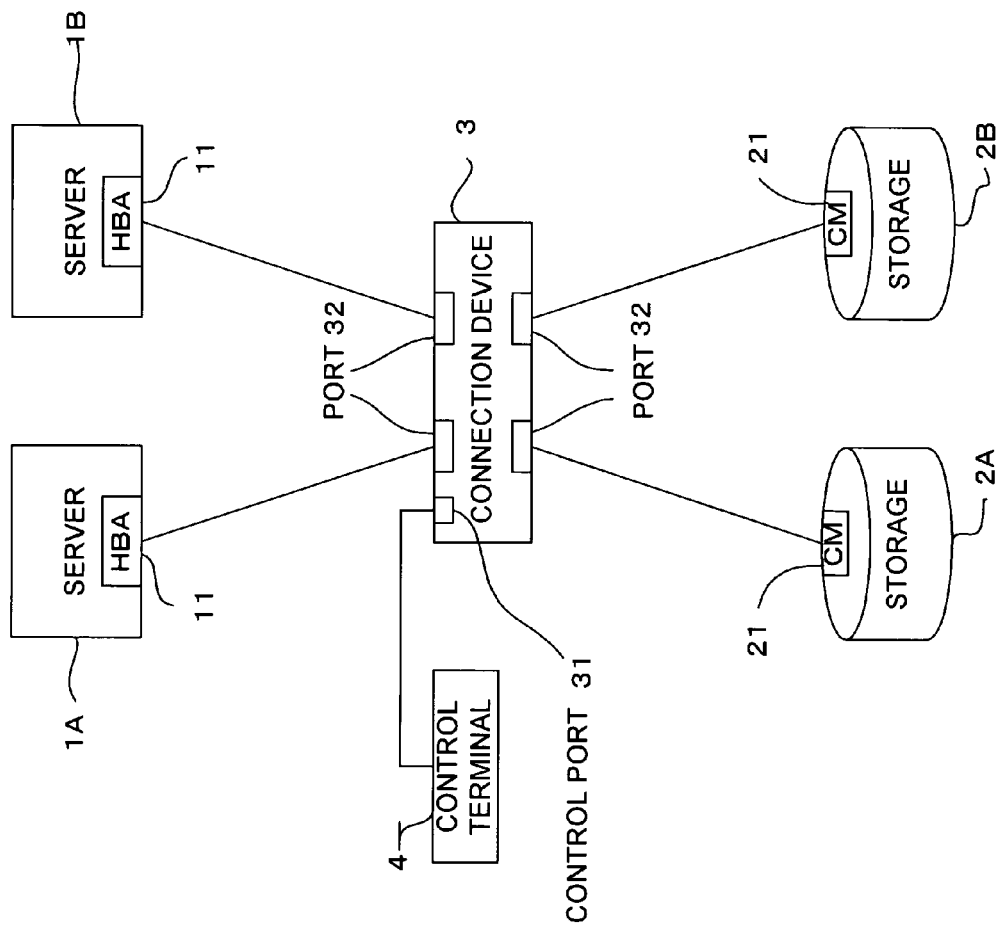
FIG. 1 is an example of the configuration of an information system in an aspect of this invention.

FIG. 1 is an example of the configuration of an information system of one aspect of the invention. The information system of FIG. 1 contains servers 1 which execute a business application or similar, storages 2 storing data used when the business application is executed and being accessed by the servers 1, and a connection device 3 which is connected to both the servers 1 and to the storages 2. The connection device 3 has a plurality of ports 32 which are connection interfaces to the servers 1 and storages 2, and control port (serial port, parallel port, network port, or similar) 31 which can be connected by a control terminal 4 which controls settings of the connection device 3.

The connection device 3 has a function to mediate input/output processing (IO processing) performed between the servers 1 and storages 2. That is, as shown in FIG. 1, when a plurality of servers 1 and a plurality of storages 2 are connected to the connection device 3, if the connection device 3 receives an input/output request (IO request) issued by the server 1A in order to access data stored in the storages 2B, the connection device 3 selects the port 32 to which the storages 2B is connected, and passes the IO request to the appropriate port 32. Examples of an IO request are the inquiry, read, write, or other commands issued by a server 1.

A server 1 has an HBA 11 as an interface for connection to the connection device 3; the port 32 of the connection device 3 is connected by a cable to the HBA 11. A server 1 is a general-use computer (PC, server or similar). A storages 2 has a connect module (hereafter abbreviated "CM") 21 as an interface for connection to the connection device 3, and the port 32 of the connection device 3 is connected by a cable to the CM 21. A storages 2 includes a plurality of hard disks in one housing, and has large capacity for storing data.

The control terminal 4 is realized in a general-use computer (PC, server or similar), and is connected to the connection device 3 via the control port 31. This device inputs test lists to set the operation of the connection device 3, and is used to control the start and end of tests.

Given such a connection configuration, the following explanation assumes a storage area network (hereafter "SAN") environment. It is assumed that the fiber channel (hereafter "FC") protocol is used between the servers 1 and storages 2, and that SCSI (small computer system interface) is used as the upper-level protocol relating to IO requests. A mediation function of the connection device 3 is the same as a function of conventional fiber channel switches (FC switches) in a SAN environment.

Conventionally in an information system such as that of FIG. 1, when performing various tests including performance tests and operation tests, a mechanism to generate loads and errors was incorporated into the servers 1 or storages 2, so that resources of the servers 1 used for business application and other processing were consumed, and there were various other problems also, as explained above. In this invention, by incorporating the mechanism to generate loads and errors into the connection device 3, which normally mediates connections between the servers 1 and storages 2, the above problems are resolved. Also, by performing tests using the connection device 3 of embodiment of this invention, tests can be performed without consumption of the resources of the servers 1 used in business application or other processing. A summary explanation of the connection device 3 is given in FIG. 2.

Figure 2:
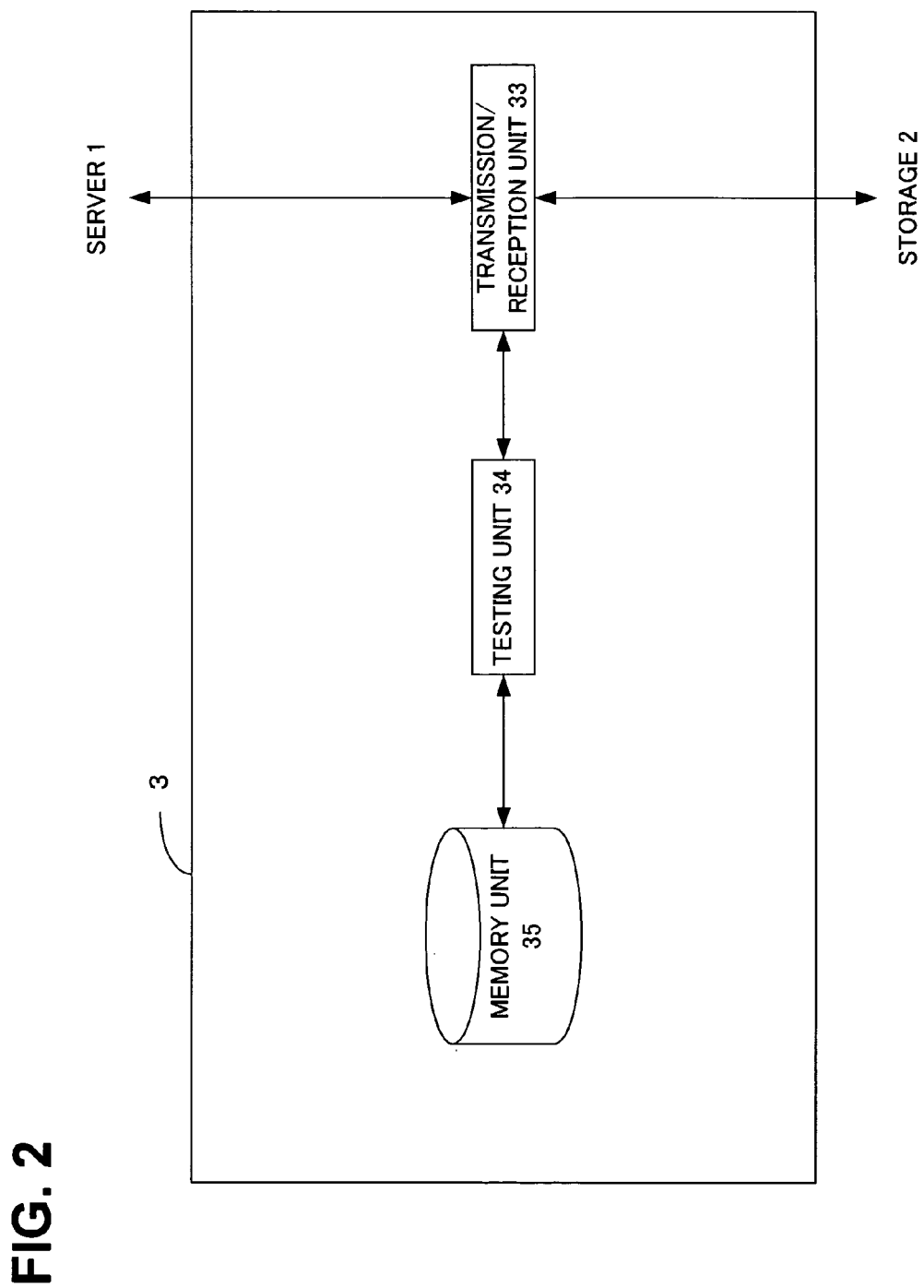
FIG. 2 is a block diagram explaining in summary a connection device of embodiment of this invention.

FIG. 2 is a block diagram explaining in summary the connection device 3 of this invention. The connection device 3 has the transmission/reception unit 33, which normally mediates IO processing performed between the servers 1 and storages 2; a memory unit 35 in which is stored information determining the operation of tests; and a testing unit 34, connected to the transmission/reception unit 33 and to the memory unit 35, into which IO requests received by the transmission/reception unit 33 are input, which analyzes these IO requests during testing, and which, according to the information stored in the memory unit 35, performs various processing.

The testing unit 34 generates a pseudo-load on a storages 2, for example by holding an IO request for a prescribed time to delay the IO request intentionally, or generates IO requests separate from the IO requests issued by a server 1 to generate a load on a storages 2. The testing unit 34 generates error messages at a fixed rate with respect to the IO requests received by the transmission/reception unit 33, and outputs these to the transmission/reception unit 33. The IO requests at the fixed rate are not transmitted to a storages 2, but instead error messages are sent to a server 1, so that pseudo-errors of a storages 2 can be generated. When performing this processing, the testing unit 34 accesses information stored in the memory unit 35 and determines the operation to be taken.

Figure 3:
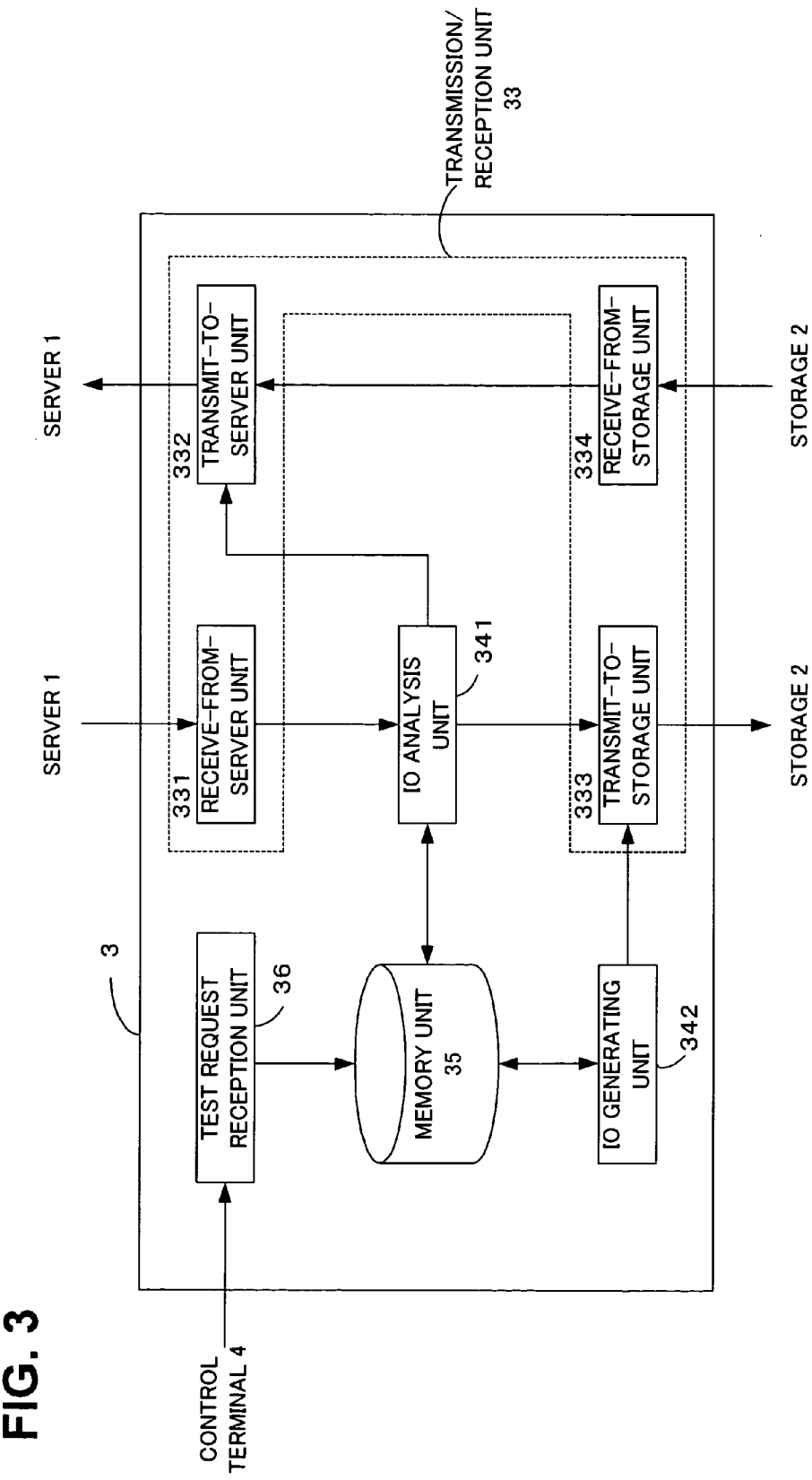
FIG. 3 is a block diagram showing an aspect of a connection device of embodiment of this invention.

FIG. 3 is a block diagram showing an aspect of the connection device 3 of this invention. In FIG. 3, the receive-from-server unit 331, transmit-to-server unit 332, transmit-to-memory unit 333, and receive-from-memory unit 334 correspond to the transmission/reception unit 33 of FIG. 2. The IO analysis unit 341 and IO generation unit 342 in FIG. 3 correspond to the testing unit 34 in FIG. 2. Each functional block can be configured in hardware, or can be configured as a software program. When a functional block is realized as a program, the program is executed by a CPU (central processing unit) (not shown) included in the connection device 3.

The memory unit 35 is storage means capable of rewriting, and is either volatile memory such as RAM (random access memory), or non-volatile memory such as flash memory or a hard disk. A state flag indicating whether tests are being executed and a test list indicating the settings for tests are stored in the memory unit 35. By referencing the test list, the type of a test to be executed, and the information required by the test, can be obtained.

The receive-from-server unit 331 receives an IO request issued by a server 1 and outputs this to the IO analysis unit 341. The IO analysis unit 341 references the state flag, not shown, stored in the memory unit 35, judges whether a test is being executed, and if a test is not being executed (normal operation), outputs the IO request input from the receive-from-server unit 331 to the transmit-to-memory unit 333 without modification. If a test is being executed, the IO analysis unit 341 references the test list, not shown, stored in the memory unit 35, identifies the type of test being executed, analyzes the IO request input from the receive-from-server unit 331 according to the test type, and determines the operation to take. For example, depending on the test type, the IO request may be held for a prescribed length of time before being output to the transmit-to-memory unit 333, or error messages may be output to the transmit-to-server unit 332 at a prescribed rate.

The transmit-to-memory unit 333 transmits IO requests input from the IO analysis unit 341 and IO requests input from the IO generation unit 342 to the target storages 2. The receive-from-memory unit 334 receives data from a storages 2 in response to an IO request arriving at the storages 2, and outputs the data to the transmit-to-server unit 332. The transmit-to-server unit 332 transmits data input from the receive-from-memory unit 334, or an error message input from the IO analysis unit 341, to the target server 1.

The test request reception unit 36 receives a test list determining test operation in advance from the control terminal 4, and stores the test list in the memory unit 35. Upon receiving a test start request from the control terminal 4, the state flag stored in the memory unit 35 is updated so as to indicate testing, according to the type of test to be executed. Also, upon receiving a test halt request from the control terminal 4, the state flag stored in the memory unit 35 is updated to indicate normal operation, according to the type of test being executed.

The IO generation unit 342 periodically references the state flag in the memory unit, and when the state flag indicates during testing period, generates an IO request based on the contents of the test list stored in the memory unit 35, and outputs the IO request to the transmit-to-memory unit 333.

Below, operation in the connection device 3 of this embodiment is explained, referring as appropriately to flowcharts, the data configuration of test lists, and other necessary information. The operation to be explained includes the operation when tests are not being executed (called "normal" operation); the operation when, by holding an IO request for a prescribed time in the connection device 3, the IO request is intentionally delayed, and a pseudo-load is generated in a storages 2 (called a "first test"); the operation when an IO request is generated separately from an IO request issued by a server 1, to generate a load in a storages 2 (called a "second test"); and the operation when error messages are generated at a fixed rate for the IO requests received by the connection device 3, to generate pseudo-errors in a storages 2 (called a "third test").

First, "normal" operation is explained. Normally, that is, when no tests are being performed, the connection device 3 functions as an FC switch, and mediates the transmission and reception of packets (frames) transmitted and received in a SAN environment.

Figure 4:
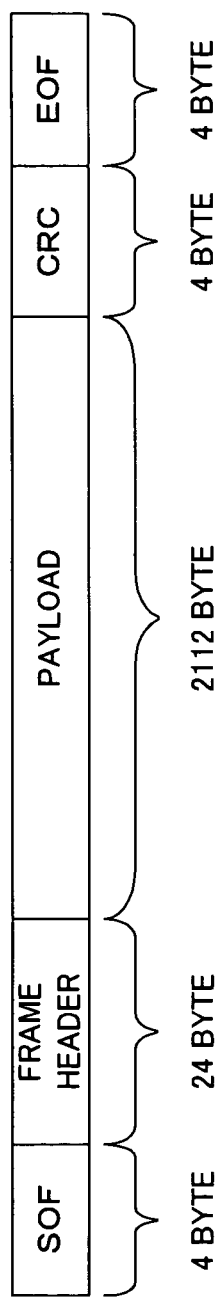
FIG. 4 shows the data configuration of a frame transmitted and received in a SAN environment.

FIG. 4 shows the data configuration of a frame transmitted and received in a SAN environment. A frame has a four-byte SOF (Start Of Frame), 24-byte frame header, 2112-byte payload, four-byte CRC (Cyclic Redundancy Check), and four-byte EOF (End Of Frame). The SOF has information indicating the frame beginning. The frame header has a transmission source address and destination address for the frame.

The address in the fiber channel is an eight-byte address called a "world wide name" which is allocated in a fixed manner to the connection device (FC switch) 3, HBA 11, CM 21, and other hardware. The payload has an optional header of up to a maximum 64 bytes; the remainder is the user data area, of variable length according to the optional header.

In the payload there is data which is exchanged according to an upper-level protocol (SCSI, IP (Internet protocol), or similar) supported by fiber channel. Hence an IO request conforming to the SCSI protocol or similar may also be contained by the payload. When an IO request included in the payload is analyzed, a command type, a device name, filename, or directory path which is the subject of the command, and other information is obtained. The CRC is a code for use in error detection during transmission and reception; the EOF includes information indicating the end of the frame.

Figure 5:
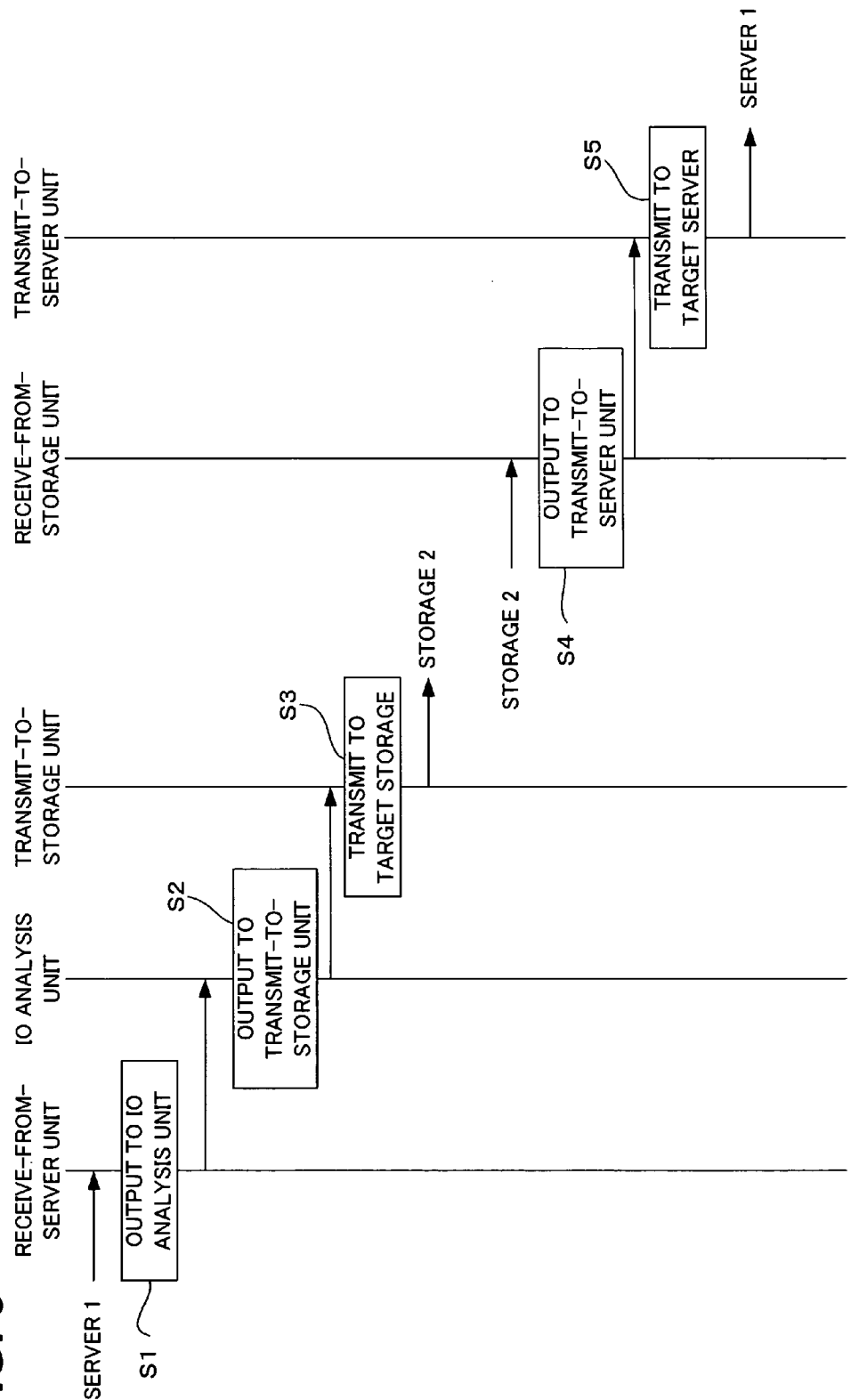
FIG. 5 is a flowchart used to explain normal operation in a connection device.

FIG. 5 is a flowchart used to explain normal operation in a connection device. The receive-from-server unit 331 receives a frame including an IO request to a storages 2 from a server 1, and outputs the frame to the IO analysis unit 341 (S1). During normal operation, the IO analysis unit 341 outputs the frame input from the receive-from-server unit 331, without modification, to the transmit-to-memory unit 333 (S2). The transmit-to-memory unit 333 references the destination address included in the frame header (see FIG. 4) of the frame, selects the port 32 to which the storages 2 of the destination address is connected, and transmits the frame to the target storages 2 via the port 32 (S3).

The storages 2 performs processing according to the IO request in the frame from the server 1, sets the information generated as a result of the processing in the payload (see FIG. 4), and transmits a frame having a frame header in which the transmission source address is the storages 2, and the destination address is the server 1 issuing the IO request.

The receive-from-memory unit 334 receives the frame from the storages 2, and outputs the frame to the transmit-to-server unit 332 (S4). The transmit-to-server unit 332 references the destination address included in the frame header of the frame, selects the port 32 connected to the server 1 of the destination address, and transmits the frame, via this port 32, to the target server 1 (S5).

Thus during normal operation, the connection device 3 transmits a frame received from a server 1 to the target storages 2, and transmits a frame received from a storages 2 to the target server 1. In FIG. 3, a frame output from the receive-from-server unit 331 during normal operation passes through the IO analysis unit 341; but a connection device 3 configuration can also be employed in which the IO analysis unit 341 is circumvented, and the frame is input directly to the transmit-to-memory unit 333.

Next, operation for execution of a "first test" is explained, in which, by holding an IO request for a prescribed time in the connection device 3, the IO request is intentionally delayed, and a pseudo-load is generated in a storages 2.

FIG. 6 is an example of the data configuration of a test list when a first test is executed. The test list is setting information to determine the operation of the test, and is stored in the memory unit 35 prior to the start of the test. In the test list of FIG. 6, types, device names, distribution methods, and parameter information are stored in separate data fields.

"Type" is a code which identifies the type of test. In FIG. 5, the first test is performed, and so "1" is used. "Device name" is a name of the device included in the storage 2 to be tested. As the device name, a physical device name of a hard disk included in the storages 2, or a logical device name can be used. Also, a path name to a file or directory can also be used as the device name. In this case, a logical volume, which uses the storage areas of a plurality of hard disks in the path as a single virtual hard disk, may be applied as well.

"Distribution method" refers to the probability distribution used when determining times over which IO requests are held. And, a "parameter" is parameter information to determine the probability distribution specified by the distribution method; the number of parameters varies depending on the probability distribution. For example, if a normal distribution is used, the parameters are the mean $\mu$ and the standard deviation $\sigma$, so that in the first row of the test list in FIG. 6, two parameter values are stored. If the distribution is the Poisson distribution, the parameter is the population parameter $\lambda$, and so in the second row of the test list in FIG. 6, a single parameter value is stored.

Next, the operation of the first test is explained, using the flowchart for the principal functional unit. The state flag is stored in advance in the memory unit 35, and "0", indicating normal operation, is set as the initial value.

Figure 7:
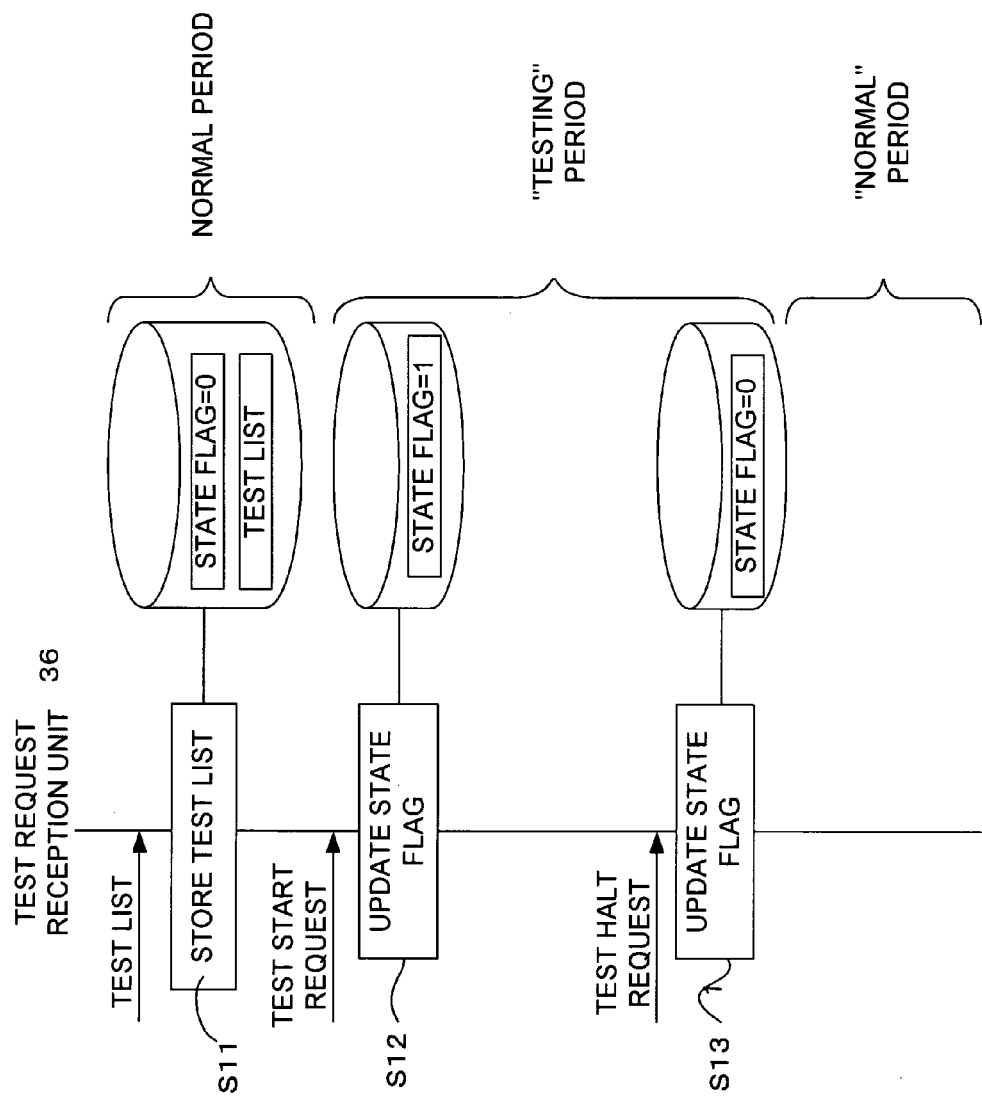
FIG. 7 is a flowchart showing operation of a test request reception unit.

FIG. 7 is a flowchart showing operation of the test request reception unit 36. When the test request reception unit 36 is started, a state of waiting for input of a test list is entered. When a test list is input, the input test list is stored in the memory unit 35 (S11). The data configuration of an input test list is, in the case of the first test, similar to that of FIG. 6.

Next, a state of waiting for input of a test start request is entered. When a test start request is input, the state flag stored in the memory unit 35 is updated to "1" indicating that a test is being executed (S12). Then, a state of waiting for the input of a test halt request is entered. When a test halt request is input, the state flag is returned to "0" (S13), and again the input of a new test list is awaited.

Between step S12 and step S13, the state flag is "1", indicating that a test is being executed. During this period (during the period of test execution), the first test is executed. In other periods, "normal" processing (FIG. 5) is performed by the connection device 3.

Figure 8:
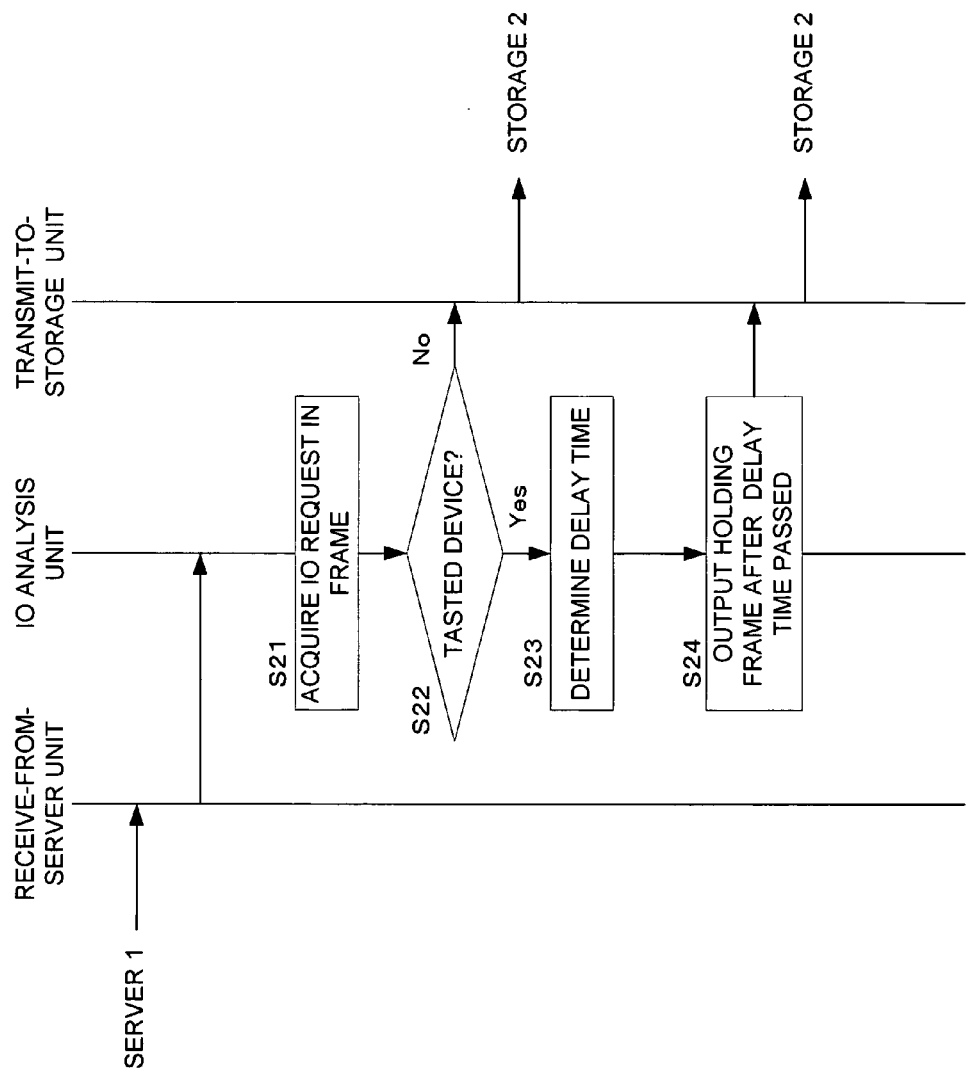
FIG. 8 is a flowchart explaining processing performed by a functional unit relating to a first test during a test execution period.

FIG. 8 is a flowchart explaining processing performed by a functional unit relating to a first test during a test execution period. During the test execution period, the IO analysis unit 341, to which a frame has been input by the receive-from-server unit 331, acquires the IO request contained in the payload (see FIG. 4) of the frame (S21). And, the IO analysis unit 341 judges whether the subject of the acquired IO request (the subject of the command) is the device being tested or not (S22).

The judgment of step S22 is performed by searching the test list (FIG. 6) stored in the memory unit 35, using as the key the device name which is the subject of the command, obtained by analyzing the IO request acquired in step S21. If as a result of the judgment of step S22 the IO request subject is the device to be tested, the IO analysis unit 341 determines the delay time based on the test list (S23). In step S23, a random number is generated based on the probability distribution specified by the distribution method and parameters contained in the test list, and using this value as the delay time.

The IO analysis unit 341 holds the IO request acquired in step S21 until the delay time determined in step S23 elapses, and after the delay time has passed, outputs the frame including the IO request to the transmit-to-memory unit 333 (S24). If as a result of the judgment of step S22, the IO request subject is not the device to be tested, the IO analysis unit 341 outputs the frame without change to the transmit-to-memory unit 333, and so no delay occurs.

By thus holding for a prescribed time in the connection device 3 a frame containing an IO request which has been sent to a tested device to cause a delay, the response time from the issuance of the IO request by the server 1 until the response is acquired by the storages 2 is delayed, and so an increased load condition on the storages 2 can be reproduced without using the resources of the server 1. In this way, it is possible to easily perform operation tests of a server 1 when the storages 2 is supposed to be heavily loaded (for example, to test whether switching of a specific volume used by a server 1 is possible when it is assumed that access is concentrated on the volume), and to easily perform performance tests under these conditions (for example, measuring the number of seconds from recognition of the load until switching is performed).

Next, operation to execute a "second test", in which an IO request is generated separately from an IO request issued by a server 1 and a load is generated on a storages 2, is explained.

FIG. 9 is an example of the data configuration of a test list when executing a second test. The test list is setting information to determine the operation to be performed, and is stored in the memory unit 35 before the beginning of the test. In the test list of FIG. 9, types, device names, access types, data sizes, IO ratios, and IO issue frequency are stored in respective data fields.

"Type" is a code which identifies the type of test. In FIG. 9, the second test is performed, and so "II" is used. "Device name" is the device name included in the storages 2 to be tested. As the device name, a physical device name of a hard disk included in the storages 2, or a logical device name can be used. Also, a path name to a file or directory can also be used as the device name. In this case, a logical volume, which uses the storage areas of a plurality of hard disks in the path as a single virtual hard disk, may be applied as well.

"Access type" determines the access operation of the IO request generated by the connection device 3, and is either random access or sequential access. "Data size" indicates the size of the data read, or the size of the data written. In FIG. 9, kilobyte (kB) units are used. "IO ratio" is a value from 0 to 1 indicating the ratio of the number of write requests to the number of read requests among the generated IO requests. Represented as an equation, the "IO ratio" would be equal to (number of read requests)/(number of read requests+number of write requests).

For example, if the IO ratio is 1, then 100% of the generated IO requests are read requests; conversely, 0 signifies that 100% of the IO requests are write requests. An IO ratio of 0.33 indicates that read requests and write requests are generated in a 1:2 ratio, and an IO ratio of 0.5 indicates that read requests and write requests are generated in exactly the same number. The "IO issue frequency" is the number of IO requests generated per unit second. Hence in the case of the first row of the test list in FIG. 8, 200 read requests are generated in one second, and in the second row, 100 write requests and 100 read requests are generated in each second.

Next, operation of the second test is explained using a flowchart of the principal functional unit. The state flag is stored in advance in the memory unit 35, and "0", indicating normal operation, is set as the initial value. Operation of the test request reception unit 36 is the same as in FIG. 7. That is, when the test request reception unit 36 is started, a state of waiting for input of a test list is entered. When the test list shown in FIG. 9 is input, the input test list is stored in the memory unit 35 (S11).

Then, input of a test start request is awaited, and when a test start request is input, the state flag stored in the memory unit 35 is updated to "1", indicating a test is being executed (S12). Next, input of a test halt request is awaited, and when a test halt request is input the state flag is returned to "0" (S13), and again the input of a new test list is awaited. The second test is executed during the test execution period (the period during which the state flag is "1"). During other periods, "normal" processing (FIG. 5) is performed in the connection device 3.

Figure 10:
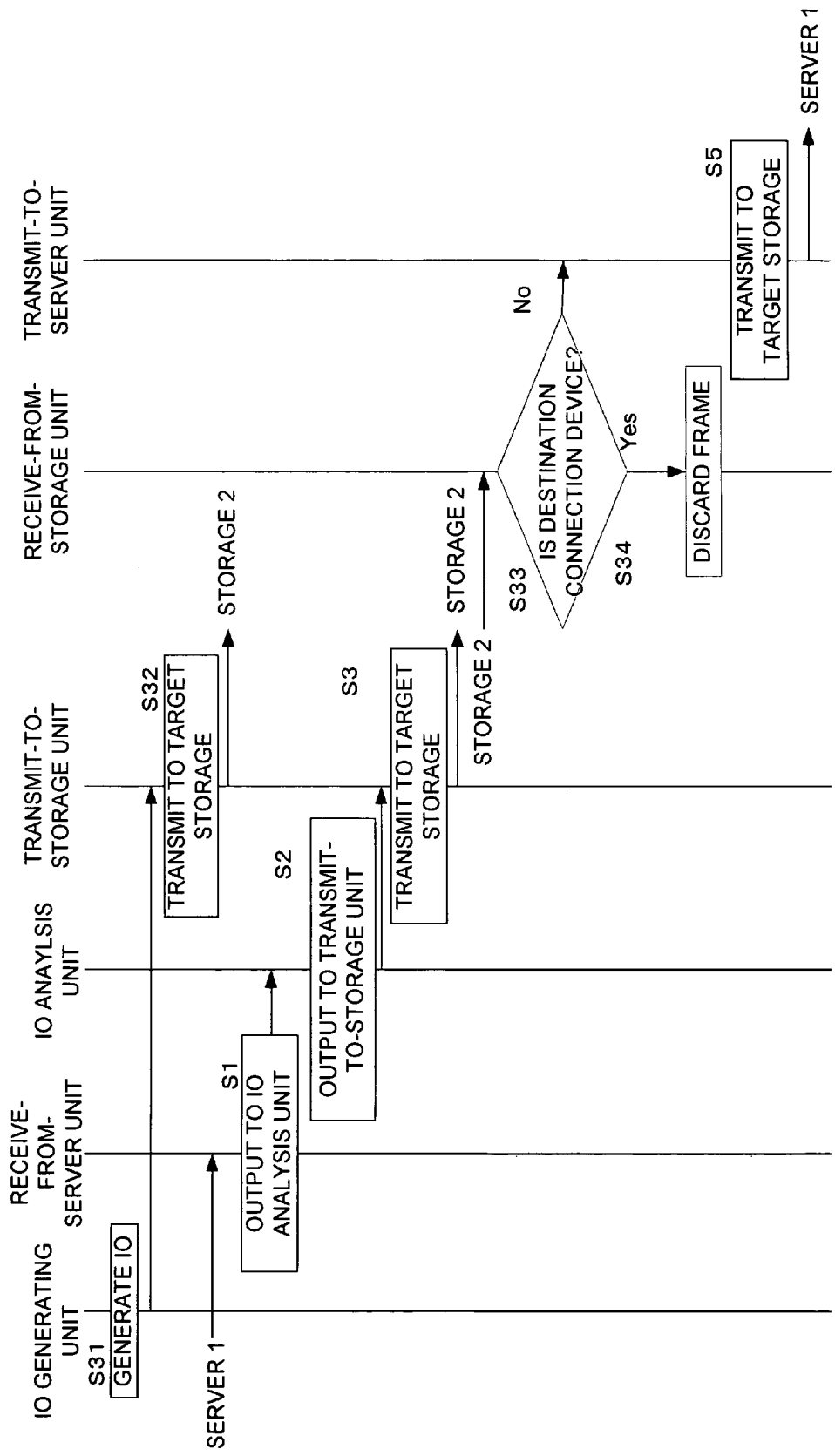
FIG. 10 is a flowchart explaining processing performed by a functional unit relating to a second test during a test execution period.

FIG. 10 is a flowchart explaining processing performed by a functional unit relating to the second test during a test execution period. During the test execution period, the IO generation unit 342 generates IO requests based on the test list stored in the memory unit 35, and outputs frames with the IO requests set in the payload to the transmit-to-memory unit 333 (S31). The subject of the IO request generated is determined by the device name of the test list in FIG. 9. The IO generation unit 342 identifies the storages 2 including the subject of the IO request.

Then a frame, having a frame header in which the destination address is the (CM of the) storages 2 and the connection device 3 is the transmission source address, and with the generated IO request set in the payload, is output to the transmit-to-memory unit 333. The transmit-to-memory unit 333, to which the frame has been input from the IO generation unit 342, references the destination address contained in the frame header (see FIG. 4) of the frame, selects the port 32 connected to the storages 2 of the destination address, and transmits the frame to the target storages 2 via the port 32 (S32).

The second test does not obstruct IO requests issued from a server 1, and so when a frame is received from a server 1 during a test execution period, the connection device 3 performs the processing from step S1 to step S3 in FIG. 4. When a frame is received from a storages 2 during a test execution period, the processing described below is performed rather than the steps S4 and S5 of FIG. 4.

The receive-from-memory unit 334 receives the frame from the storages 2, and judges whether the destination of the received frame is the connection device 3 (S33). If the destination of the received frame is the connection device 3, then the frame is the response by the storages 2 to an IO request generated by the IO generation unit 342, and the frame need not be transmitted to the server 1.

Hence the receive-from-memory unit 334 references the destination address contained in the frame header, and if the destination is the connection device 3, discards the frame (S34). If the destination is not the connection device 3 ("No" in S33), the receive-from-memory unit 334 outputs the frame to the transmit-to-server unit 332. The transmit-to-server unit 332 then references the destination address contained in the frame header of the frame, selects the port 32 connected to the server 1 of the destination address, and transmits the frame to the target server 1 via the port 32 (S5).

In this way, by having the connection device 3 generate an IO request for the device to be tested and transmit a frame containing the IO request from the connection device 3 to the target storages 2, a load on the storages 2 can be generated without using the resources of the server 1. Thus it is possible to easily perform operation tests of a server 1 during heavy loading of a storages 2, and to execute performance tests at this time.

The above tests reproduce heavy loading states in a storages 2; next, the operation when executing a "third test" in which error messages are generated at a fixed rate with respect to IO requests received by the connection device 3, to generate pseudo-errors in the storages 2, is explained.

FIG. 11 is an example of the data configuration of a test list when a third test is executed. The test list is setting information to determine the operation of the test, and is stored in the memory unit 35 before the beginning of the test. In the test list of FIG. 11, types, device names, IO types, error occurrence probabilities, numbers of IOs received, and numbers of error responses are stored in separate data fields.

"Type" is a code which identifies the type of test. In FIG. 11, the third test is performed, and so "III" is used. "Device name" is the device name included in the storages 2 to be tested. As the device name, a physical device name of a hard disk in the storages 2, or a logical device name can be used. Also, a path name to a file or directory can also be used as the device name. In this case, a logical volume, which uses the storage areas of a plurality of hard disks in the path as a single virtual hard disk, may be applied as well.

"IO type" identifies the IO request to which an error response is given. For example, if the IO type is "WRITE", then error messages are generated at a prescribed rate in response to write requests for a certain device; if the IO type is "READ", then error messages are generated at a prescribed rate in response to read requests for a certain device. If the IO type is "ALL", then error messages are generated at a prescribed rate in response to all IO requests for a certain device.

"Error occurrence probability" is a threshold value to judge whether to generate an error message for a received IO request. "Error type" is the type of error message to be generated when an error response is given. For example, if the IO type is "READ", then the error types which can be set are "EAGAIN", "ERESATRTS" and similar; if the IO type is "WRITE", then the error types which can be set are "EIO", "EAGAIN" and similar. "Number of IOs received" is the number of IO requests received thus far; "number of error responses" is the number of times error messages have been generated thus far. The number of IOs received and number of error responses both have initial values of 0, and are updated as the test is executed.

Next, operation of the third test is explained using a flowchart of the principal functional unit. The state flag is stored in the memory unit 35 in advance, and "0", indicating normal operation, is set as the initial value. The operation of the test request reception unit 36 is the same as in FIG. 7. That is, when the test request reception unit 36 is started, a state of waiting for input of a test list is entered. When the test list shown in FIG. 11 is input, the input test list is stored in the memory unit 35 (S11). "0" is automatically set as the initial values of the number of received IOs and the number of error responses, and so of the data fields in FIG. 11, only the device name, IO type, and error occurrence probability need be input.

Next, input of a test start request is awaited, and when a test start request is input, the state flag stored in the memory unit 35 is updated to "1" indicating that a test is being executed (S12). Then, input of a test halt request is awaited, and when a test halt request is input, the state flag is returned to "0" (S13), and again the input of a new test list is awaited. During the test execution period (the period in which the state flag is "1"), the third test is executed. During other periods, "normal" processing (FIG. 4) is performed in the connection device 3.

FIG. 12 is a flowchart explaining processing performed by a functional unit relating to a third test during a test execution period. During the test execution period, the IO analysis unit 341, to which a frame has been input by the receive-from-server unit 331, acquires the IO request contained in the payload (see FIG. 4) of the frame (S41). Then, the IO analysis unit 341 judges whether the subject (command subject) of the acquired IO request is the device to be tested (S42).

As in step S22, the judgment of step S42 is performed by searching the test list (FIG. 11) stored in the memory unit 35, using as the key the device name which is the subject of the command, obtained by analyzing the IO request acquired in step S41, and if there is a matching entry, judging whether it is the device to be tested. If as the result of the judgment in step S42 the subject of the IO request is the device to be tested, the IO analysis unit 341 increments by 1 the number of IOs received in the test list (S43).

Then, a judgment is made as to whether an error message should be generated for the received IO request to give an error response (S44). The judgment of step S44 is performed by judging whether the IO type of the matching entry in the judgment of step S42 coincides with the command of the acquired IO type. If the two do not coincide, an error response should not be made, and so the judgment in step S44 is "No". If there is coincidence, a judgment is made as to whether the equation "(error occurrence probability)$\geq$ (number of error responses)/(number of received IOs)" (equation A) obtains.

These values are obtained by accessing the test list (FIG. 11). If the equation A is satisfied, an error response should be made; if the equation A is not satisfied, an error response should not be made. If as the result of the judgment in step S44 an error response should be made, the IO analysis unit 341 increments by 1 the number of error responses in the test list (S45).

Finally, the IO analysis unit 341 generates and sets in the payload including an error message of the type set in the error type of the test list, generates a frame header by replacing the transmission source address and the destination address contained in the frame header of the frame input in step S41 each other, and outputs the frame containing this frame header and payload with error message to the transmit-to-server unit 332 (S46). If as the result of the judgment in step S42 the subject is not the device being tested, or if as the result of the judgment in step S44 an error response should not be made, the IO analysis unit 341 outputs the frame without modification to the transmit-to-memory unit 333.

Thus by generating error messages in the connection device 3 at a prescribed rate with respect to received IO requests and transmitting these to a server 1, an error state for a storages 2 to be tested can be reproduced without using the resources of the server 1 or storages 2. In this way, operation tests of a server 1 upon occurrence of errors in a storages 2, and performance tests at this time, can easily be performed.

If tests are performed using the above-described connection device 3, tests can be performed without changing the settings of the server 1 or storages 2, so that even if tests are performed the impact on an already-constructed information system can be suppressed. Also, if an information system is constructed using a connection device 3 of this embodiment of the invention from the beginning, tests can of course be conducted without the need to exchange equipment, and even if the connection device 3 of this invention is not used when constructing the information system, it is only necessary to replace the existing FC switch or similar. In general, the number of FC switches present in information systems is small compared to the total number of servers 1 or storages 2, and the fact that this replacement takes less time than the task of changing settings for each server 1 and storages 2 as in the prior art, is another advantage of this invention.

Hence it is possible to, for example, utilize a previously constructed information system without change while easily performing performance tests, operation tests and similar during time periods in which access is comparatively infrequent and there is some margin in the frequency of transactions and rate of use of resources. And, if connection devices are incorporated into an information system in advance during system construction, problems with wiring, erroneous connections and the like which might occur during test execution become unlikely.

While illustrative and presently preferred embodiments of the present invention have been described in detail herein, it is to be understood that the inventive concepts may be otherwise variously embodied and employed and that the appended claims are intended to be constructed to include such variations except insofar as limited by the prior art.

What is claimed is:

1. An information system, comprising:
   a server;
   a data storage device, accessed by said server by issuing an input/output request in order to write information or to read said written information; and
   a connection device connected to said server and to said data storage device, including a transmission/reception unit to mediate information exchanged between said server and said data storage device, which transfers said input/output request transmitted from said server to said data storage device, and transfers information transmitted by said data storage device in response to said input/output request to said server, wherein
   said connection device further includes:
   a memory unit for storing in advance a test list which associates information identifying said data storage device to be tested with setting information related to tests; and
   an input/output analysis unit, connected to said transmission/reception unit and to said memory unit, which, upon input of said input/output request received by said transmission/reception unit, references said test list and judges whether the destination of the input/output request is said data storage device to be tested, and if the destination of the input/output request is said storage device to be tested, outputs the input/output request to said transmission/reception unit after a prescribed length of time has elapsed.

2. The information system according to claim 1, wherein said setting information further has a probability distribution and a parameter identifying the probability distribution in association with information identifying said data storage device to be tested, and said prescribed time is determined based on said probability distribution and on said parameter.

3. An information system, comprising:
   a server;
   a data storage device, accessed by said server by issuing an input/output request in order to write information or to read said written information; and
   a connection device connected to said server and to said data storage device, including a transmission/reception unit to mediate information exchanged between said server and said data storage device, which transfers said input/output request transmitted from said server to said data storage device, and transfers information transmitted by said data storage device in response to said input/output requests to said server, wherein
   said connection device further includes:
   a memory unit for storing in advance a test list which associates information identifying said data storage device to be tested with setting information related to tests; and
   an input/output analysis unit, connected to said transmission/reception unit and to said memory unit, which, upon input of said input/output request received by said transmission/reception unit, references said test list and judges whether the destination of the input/output request is said data storage device to be tested, and if the destination of the input/output request is said storage device to be tested, generates an error message at a prescribed rate and outputs the error message to said transmission/reception unit, and wherein
   said transmission/reception unit, upon input of said error message from said input/output analysis unit, sends said error message to said server which had issued said input/output request.

4. An information system, comprising:
   a server;
   a data storage device, accessed by said server by issuing an input/output request in order to write information or to read said written information; and
   a connection device connected to said server and to said data storage device, including a transmission/reception unit to mediate information exchanged between said server and said data storage device, which transfers said input/output request transmitted from said server to said data storage device, and transfers information transmitted by said data storage device in response to said input/output request to said server, wherein
   said connection device further includes an input/output generation unit, connected to said transmission/reception unit, which generates an input/output request with said connection device as request source and said data storage device as destination, and outputs the generated input/output request to said transmission/reception unit, and wherein
   said transmission/reception unit, upon receiving information from said data storage device in response to said input/output request generated by said input/output generation unit, discards the information.

5. The information system according to claim 1, wherein said connection device further includes an input/output generation unit, connected to said transmission/reception unit and to said memory unit, which generates an input/output request with said connection device as request source and said data storage device as the destination, and outputs the generated input/output request to said transmission/reception unit, and wherein said transmission/reception unit, upon receiving information from said data storage device in response to said input/output request generated by said input/output generation unit, discards the information.

6. The information system according to claim 3, wherein said connection device further includes an input/output generation unit, connected to said transmission/reception unit and to said memory unit, which generates an input/output request with said connection device as request source and said data storage device as the destination, and outputs the generated input/output request to said transmission/reception unit, and wherein said transmission/reception unit, upon receiving information from said data storage device in response to said input/output request generated by said input/output generation unit, discards the information.

7. A testing method for use in an information system having:
a server;
a data storage device, accessed by said server by issuing an input/output request in order to write information or to read said written information; and
a connection device connected to said server and to said data storage device, including a transmission/reception unit to mediate information exchanged between said server and said data storage device, which transfers said input/output request transmitted from said server to said data storage device, and transfers information transmitted by said data storage device in response to said input/output request to said server,
said testing method being a testing method of generating a pseudo-load on said data storage device comprising the steps of:
receiving an input/output request issued by said server to said data storage device at said connection device;
judging whether the destination of the input/output request is said data storage device to be tested at said connection device; and
if the destination of the input/output request is the storage device to be tested, holding the input/output request for a prescribed time before transmitting to said data storage device of said destination at said connection device.

8. A testing method for use in an information system having:
a server;
a data storage device, accessed by said server by issuing an input/output request in order to write information or to read said written information; and
a connection device connected to said server and to said data storage device, including a transmission/reception unit to mediate information exchanged between said server and said data storage device, which transfers said input/output request transmitted from said server to said data storage device, and transfers information transmitted by said data storage device in response to said input/output requests to said server,
said testing method being a testing method of generating an error for said data storage device comprising the steps of:
receiving an input/output request issued by said server to said data storage device at said connection device;
judging whether the destination of the input/output request is said data storage device to be tested at said connection device; and
if the destination of the input/output request is the storage device to be tested, transmitting an error message at a prescribed rate to said server issuing the input/output request at said connection device.

9. A testing method for use in an information system having:
a server;
a data storage device, accessed by said server by issuing an input/output request in order to write information or to read said written information; and
a connection device connected to said server and to said data storage device, including a transmission/reception unit to mediate information exchanged between said server and said data storage device, which transfers said input/output request transmitted from said server to said data storage device, and transfers information transmitted by said data storage device in response to said input/output requests to said server,
said testing method being a testing method of generating an error for said data storage device comprising the steps of:
generating an input/output request to said data storage device at said connection device;
issuing the input/output request to said data storage device at said connection device; and
upon receiving information from said data storage device in response to said input/output request issued by the connection device, discarding the information at said connection device.

10. The testing method according to claim 7, further comprising the steps of:
generating an input/output request to said data storage device at said connection device;
issuing said input/output request to said data storage device at said connection device; and
upon receiving information from said data storage device in response to said input/output request issued by the connection device, discarding the information at said connection device.

11. The testing method according to claim 8, further comprising the steps of:
generating an input/output request to said data storage device at said connection device;
issuing said input/output request to said data storage device at said connection device; and
upon receiving information from said data storage device in response to said input/output request issued by the connection device, discarding the information at said connection device.

* * * * *